Patented June 18, 1946

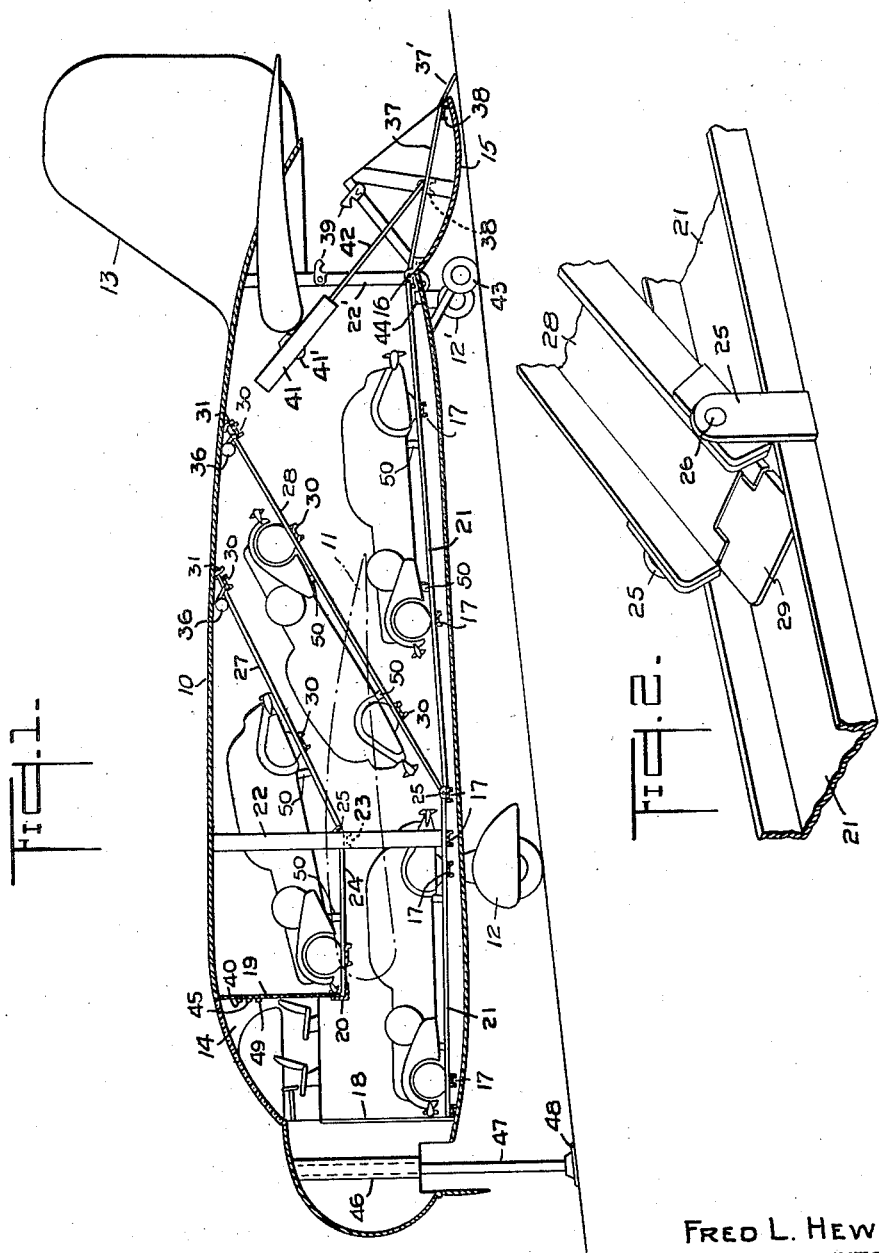

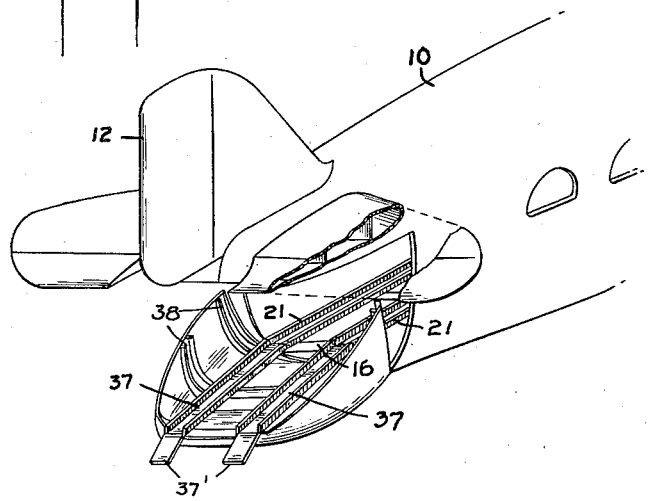
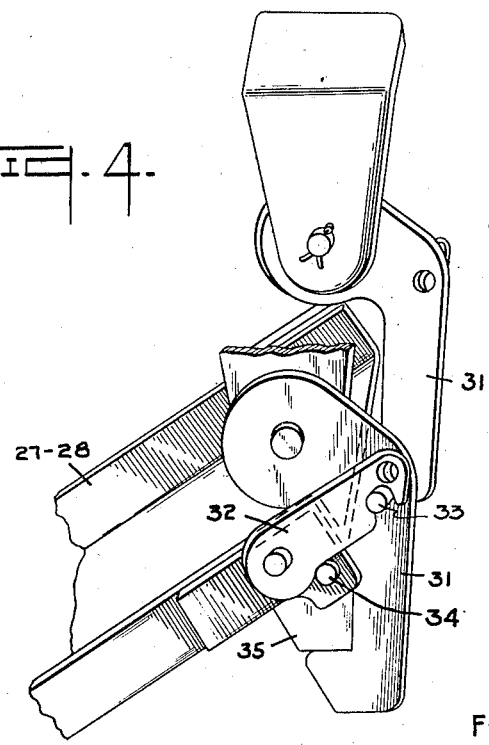
Fred L. Hewitt
INVENTOR

2,402,283

UNITED STATES PATENT OFFICE 2,402,283

AIRPLANE WITH MATERIAL AND ARTICLE HANDLING EQUIPMENT

Fred L. Hewitt, Montville, N. J., assignor to Overlakes Freight Corporation, Detroit, Mich., a corporation of Delaware Application November 18, 1943, Serial No. 510,722

3 Claims. (Cl. 244—118)

My invention relates generally to cargo carrying planes and trailers or gliders constructed to transport heavy loads, and the invention has reference particularly to improvements in the construction of the cargo carrying compartments of the air transport and to the facilities embodied therein for loading and discharging the cargo at the air depots and for safely storing the load while in flight.

Airplanes have been used extensively for cargo carriers and various means are provided in the construction of such planes to facilitate loading and storing of the loads. In the present invention the improvements are directed to the arrangement of automobile handling apparatus, whereby a plurality of cars fully equipped and ready for delivery may be efficiently loaded within the storage compartment of a plane or glider and securely fixed against shifting or displacement while in transit.

It has been the experience of cargo handling concerns that while the plane is a simple and efficient means for quickly receiving and safely storing motor vehicles and having the same reach their destination as quickly as possible, the proposition can only be maintained on a commercial basis where a maximum load can be carried. It is, therefore, the principal object of the present invention to afford storage facilities within the cargo compartment of a plane or glider, whereby the automobiles to be transported are arranged on different elevations and at various angles within the cargo compartment to utilize the entire available space.

A further object of the invention is to provide loading equipment for an airborne transport, of the character described, wherein the latter may be loaded and unloaded with a maximum of efficiency and under all ground conditions involving landing surfaces which are soft because of the presence of mud or sand.

A still further object of the present invention is to provide an airplane construction with a movable piston-controlled cargo door to afford easy access to the interior of the cargo compartment.

And a still further object of the invention is to provide a system of movable ramps or tracks within the loading compartment of a plane, to cooperate in guiding the cars to their storage positions and thereafter adjust themselves to hold the cars in their permanent positions during flight.

I accomplish the various objects of the invention by means of certain novel combinations and arrangement of parts hereinafter described in the specifications, set forth in the appended claims and illustratively exemplified in the accompanying drawings, in which:

Figure 1 is a substantially longitudinal sectional view of a cargo carrying plane or glider showing the improved arrangement of the automobile handling apparatus in a loaded position and the cargo door in open position;

Figure 2 is a fragmentary perspective view of a section of a track or runway and the hinged connection for the ramp whereby the automobile carrying apparatus is raised and lowered;

Figure 3 is a perspective view of the cargo door in open position for loading or discharging the cargo; and Figure 4 is a fragmentary perspective view of the locking device by means of which the tracks or ramps of the automobile carrying apparatus are locked in position after the loading operation is completed.

Referring to the drawings, and particularly Figure 1, 10 denotes the body or hull of a cargo plane and 11 the wings, shown in dotted lines. The hull 10 carries the landing gear 12 and 12', vertical fin and rudder 13 and is provided with a control room 14 at the nose end and an opening at the tail closed by a cargo door 15. The cargo door 15 conforms to the contour of the hull 10 and is attached thereto along its bottom edge by means of a hinge connection 16. The entire interior of the hull 10, with the exception of the control room 14, is designed to afford cargo space.

The cargo space or compartment within the hull 10 is fitted with a plurality of spaced transverse beams 17 arranged slightly above the under side or belly of the hull, the first such beam being disposed back of the nose and under the control room 14, the second set traversing the mid section of the hull, while the remainder are disposed equally between the second set and the hinge connection 16, the rearmost beam 17 being directly over the rear landing gear 12'. A forward upright bulkhead 18 is disposed upon the forward beam 17 and projects to support the forward end of the control room 14, the rear wall thereof being carried on a bulkhead 19, which receives its support from a transverse angle bar 20 disposed approximately midway the height of the hull 10.

Extending from the forward bulkhead 18 and resting upon the transverse beams 17 is a pair of channels 21, spaced apart to accommodate the standard gauge of the automobile wheels. Upright beams 22 are arranged on opposite ends of one of centrally disposed lateral beams 17, the upper ends of the beams 22 abutting the top of the hull 10. A rear bulkhead 23 is disposed between the upright beams 22 on a level with the bulkhead 19 and bridging the two bulkheads are channel pieces 24, which are spaced apart the same distance as that of the lower channels 21, and which are at an elevation to allow a car supported on the lower channels 21 to be run in and under the upper channels 24. The rear ends of the channels 24 are provided with hinged fixtures comprising upright side bearing plates 25, stud shafts 26 at the upper ends thereof and hinged channel ramp pieces 27 pivotally mounted at their inner ends on the shafts 26. The channel ramp pieces 27 are approximately twenty feet in length and their outer ends projecting towards the tail of the hull 10 are provided with a locking device of the character illustratively exemplified in Figure 4 to enable the free ends of the ramp to be locked to the roof of the cargo compartment. A second channel ramp 28 is hinged to the lower channel pieces 21 at a point rearwardly of the upright beams 22 in the manner detailed in Figure 2, i. e., each channel ramp is capable of swinging to an upwardly inclined position and being locked to the roof of the hull in the manner of the first ramp and of resting directly within the lower channels in its lowered position. The hinged ends of each channel ramp piece 28 are provided with hinged toe plates 29 which rest at their free ends upon the bottom of the channels 21 to provide an incline over which the wheels of the vehicle pass to the lower channels with a minimum drop. The channels of each of the ramps are securely held at the proper gauge by means of cross members 30, two thereof being disposed preferably at points coming directly beneath the sets of car wheels.

The locking members, see Figure 4, comprise pivotally supported hook shaped arms 31 at the roof of the hull 10, which are embraced by pivotally mounted extensions 32 of the free ends of the side walls of the channel pieces, and which carry pins 33 engaged by the hooked ends of the extensions 32. Stop pins 34 on the channel pieces beneath the extensions 32 prevent them from swinging downwardly and lugs 35 beneath the channels 27—28 fit the hooks of the depending arms 31 to support the ramp while the hook or lock engagement of the extensions 32 with the arms 31 prevent the latter from swinging away and releasing the ramp.

The ramps 27 and 28 are raised at their free ends to engage the lock mechanism by means of suitable electric hoist devices 36.

The ramps are of different transverse sections to enable the first channels 27 to drop within the channels 28 and the latter to rest within the channels 21, so as to assume their loading positions as hereinafter described.

Referring now to the construction of the cargo door 15, the latter on its inside is provided with channel tracks 37 and hinged toe plates 37' alined with the channel pieces 21 and supported on transverse U-shaped beams or ribs 38 disposed at the hinged end of the door, midway the length thereof and at the outer free end, as illustratively exemplified in Figures 1 and 3. The side walls of the door fit snugly into the cutaway portion of the tail of the hull and when in closed position a suitable lock 39 is provided to securely hold the door against the hull. The cargo door lock 39 is released through a remote control 40 located in the control room, which control also operates to displace fluid in cylinders 41 pivotally arranged on brackets 41' on the side walls of the hull 10 adjacent the opening. Pistons operate in the cylinders 41 and are connected to rods 42 which are pivotally connected to the cargo door 15 approximately midway of its length. In the operation of the control 40, fluid is displaced in the cylinders 41, causing the pistons and rods 42 to retract and swing the cargo door 15 about its hinged connection to closed position and simultaneously to cause the locking mechanism 39 to engage and hold the door closed. To open the door the remote control 40 is operated to release the lock 39 and to allow the pistons and rods 42 to project and swing the door to its lowered open position, as shown in Figure 1.

The rear upright supporting beams 22' are disposed at the sides of the hull 10 and define the inner sides of the cargo opening. Directly beneath the supporting beams 22' is a pair of suitably braced wheels 43, hereinafter referred to as a dolly, the wheels being suitably spaced apart and located on opposite sides of the rear landing gear or wheel 12' and adapted to withstand the entire weight of the plane and cargo.

The landing gear 12' is carried on a retractable piston arm 44 which when operated from a remote control 45 in the control room 14 causes the gear 12' to retract, thereby lowering the rear end of the plane to settle upon the dolly 43, which is securely attached to the plane and provides a suitable bearing upon which the plane may be loaded.

In the nose of the plane is a cylinder 46 disposed upright, in which a piston rod or jack 47 is operated, the lower end of the arm being provided with a flat shoe 48 to engage the ground. The piston rod is fluid operated and controlled from a remote control 49 in the control room 14. Upon loading or discharging cargo, the control 49 is operated causing the piston rod or arm 47 to project until the flat shoe 48 engages the ground, thereby supporting the nose of the plane against tipping forward.

Each set of channels is provided with four tie down chassis clamps 50, which are adjustable as to heights and location along the channels, and which in operation clamp onto the chassis of the car and are contracted to pull the latter down on its springs until all movement of the wheels is prevented and practically all pressure is exerted on the frame of the car and not on its tires.

In the operation of the present invention, the plane is adjusted by means of the support 47 and dolly 43 to loading position. Ramps 28 and 27 are lowered by means of the electric hoists 36 so as to bring tracks 28 within tracks 21 and the free ends of 27 inside tracks 28. The cargo door 15 is open and a car is run into the cargo compartment over tracks 21 and 28 and up on ramp 27 until the front wheels are resting on tracks 24 and the rear wheels on the ramp. The hoist 36 is set in motion and the ramp 27 is swung upwardly to its locked position as shown in Figure 1. Two more cars are then run in over tracks 21 and 28, the forward car being stored on the length of track 21 forward of the ramp 28 while the second car remains on the ramp to which it is affixed, as are all the cars, by means of the clamps 50. The second hoist 36 is set in operation and ramp 28 is raised to its upwardly inclined position and locked as shown in Figure 1. A fourth car is thereafter run in over the rear portion of the track 21 underneath the ramp 28. As a final operation the control 40 is set in motion and the piston operated cargo door is raised to closed position and locked. Controls 45 and 49 are operated and the support or jack 47 retracts while the rear gear 12' descends to lift the tail of the plane from the dolly 43. The plane and its cargo are then supported solely upon the landing gear 12 and 12' and is ready to take off. The same operation takes place if the air vehicle is a glider, the use of which enables a train of units to be taken aloft and detached at designated points to glide to a field and discharge its cargo while the remainder of the train proceeds to other destinations.

Having described my invention and the manner in which the same functions, what I claim and desire to secure by Letters Patent is:

1. In a cargo carrying aeroplane having a fuselage including a cargo compartment, a control room disposed in its upper front portion, a door in its tail portion through which cargo enters and leaves and a landing wheel structure including main landing wheels, the combination of a lower cargo floor supported adjacent the bottom of the fuselage and running from the front end substantially to the tail end thereof, a fixed upper cargo floor running about halfway between the roof of the fuselage and said lower floor and parallel to the latter from a forward plane at right angles to said floors and containing the rear wall of said control room to a rear plane extending parallel to said front plane in the vicinity of the main landing wheels, means for supporting the front and rear ends of said upper cargo floor on the fuselage, a lower cargo ramp hinged to said lower cargo floor a short distance rearwardly of said rear plane and extending to a transverse line short of the rear end of said lower floor, an upper cargo ramp hinged to the rear end of said upper floor and substantially shorter than said lower ramp to rest with its free end on the latter, and means to swing said ramps to an upwardly inclined position and to lock their free ends to the roof of the fuselage.

2. In a cargo carrying aeroplane having a fuselage including a cargo compartment, a control room disposed in its upper front portion, a door in its tail portion through which cargo enters and leaves and a two-wheel undercarriage intermediate its front end and its center, the combination of a lower cargo floor supported adjacent the bottom of the fuselage and running from the front end substantially to the tail end thereof, a fixed upper cargo floor running about halfway between the roof of the fuselage and said lower floor and parallel to the latter from a forward plane at right angles to said floors and containing the rear wall of said control room to a rear plane extending parallel to said front plane a short distance behind the wheel axis of said undercarriage, means for supporting the front and rear ends of said upper cargo floor on the fuselage, a lower cargo ramp hinged to said lower cargo floor a short distance rearwardly of said rear plane and extending to a transverse line short of the rear end of said lower floor, an upper cargo ramp hinged to the rear end of said upper floor and substantially shorter than said lower ramp to rest with its free end on the latter, and means to swing said ramps to an upwardly inclined position and to lock their free ends to the roof of the fuselage.

3. In a cargo carrying aeroplane having a fuselage including a cargo compartment, a control room disposed in its upper front portion, a door in its tail portion through which cargo enters and leaves and a two-wheel undercarriage intermediate its front end and its center, the combination of a plurality of spaced transverse beams distributed over the length of the fuselage, adjacent the bottom thereof, a central one of said beams being located in a transverse plane a short distance behind the wheel axis of said undercarriage, a lower cargo floor resting on said beams, a pair of upright struts erected on opposite ends of said central beam, a fixed upper cargo floor extending about halfway between the roof of the fuselage and said lower floor and parallel to the latter from a forward plane at right angles to said floors and containing the rear wall of said control room to a rear plane containing the longitudinal axes of said struts, said upper cargo floor having its rear end anchored to and supported by said struts, means for suspending the front end of said upper cargo floor from the roof of the fuselage, a lower cargo ramp hinged to said lower cargo floor a short distance rearwardly of said rear plane and extending to a transverse line short of the rear end of said lower floor, an upper cargo ramp hinged to the rear end of said upper floor and substantially shorter than said lower ramp to rest with its free end on the latter, and means to swing said ramps to an upwardly inclined position and to lock their free ends to the roof of the fuselage.

FRED L. HEWITT.